United States Patent [19]
Connell et al.

[11] Patent Number: 5,989,665
[45] Date of Patent: Nov. 23, 1999

[54] COPOLYESTERS OF 1,3-PROPANEDIOL HAVING IMPROVED GAS BARRIER PROPERTIES

[75] Inventors: Gary W. Connell, Church Hill; Bobby J. Sublett, Kingsport, both of Tenn.

[73] Assignee: Eastman Chemical Company, Kingsport, Tenn.

[21] Appl. No.: 09/267,373

[22] Filed: Mar. 15, 1999

[51] Int. Cl.⁶ .............................. B29D 22/00; C08G 63/02
[52] U.S. Cl. ........................ 428/36.92; 528/272; 528/298; 528/302; 528/307; 528/308; 528/308.6; 524/81; 524/401; 428/35.7; 428/357
[58] Field of Search .................................. 528/272, 298, 528/302, 307, 308, 308.6; 524/81, 401; 428/35.7, 36.92, 357

[56] References Cited

U.S. PATENT DOCUMENTS

| | | | |
|---|---|---|---|
| 4,449,303 | 5/1984 | Moore et al. | 528/308.2 |
| 4,578,437 | 3/1986 | Light et al. | 525/444 |
| 4,611,049 | 9/1986 | Kuratsuji et al. | 528/279 |
| 5,183,623 | 2/1993 | Kawaguichi et al. | 264/544 |
| 5,340,909 | 8/1994 | Doerr et al. | 528/276 |
| 5,459,229 | 10/1995 | Kelsey et al. | 528/275 |
| 5,681,918 | 10/1997 | Adams et al. | 528/279 |
| 5,798,433 | 8/1998 | Schmidt et al. | 528/279 |

FOREIGN PATENT DOCUMENTS

| | | |
|---|---|---|
| 5-31789 | 2/1993 | Japan . |
| 8-104763 | 4/1996 | Japan . |

*Primary Examiner*—Samuel A. Acquah
*Attorney, Agent, or Firm*—Cheryl J. Tubach; Harry J. Gwinnell

[57] ABSTRACT

The invention relates to a copolyester having an inherent viscosity ranging from about 0.4 to about 1.4 and a cold crystallization temperature ranging from about 120 to about 160° C. Such copolyesters comprise the reaction product of a glycol component comprising from about 85 to about 100 mole % of 1,3-propanediol, a dibasic acid component comprising from about 85 to about 100 mole % of a dibasic acid selected from terephthalic acid, napthalenedicarboxylic acid, anhydrides, acid chlorides, and lower alkyl esters thereof, and mixtures thereof, and from about 5 to about 15 mole % of a comonomer. The presence of the comonomer lowers the crystallization temperature of the copolyesters according to the invention such that amorphous preforms can be easily molded from the copolyesters. Such amorphous preforms are readily stretch blow molded into bottles or other container shapes or may be injection molded into various shapes or objects or extruded into film or sheeting. Accordingly, in another embodiment of the invention relates to film and containers prepared from the copolyester composition described above. The films and containers according to the invention have improved gas barrier properties such that they may be used for packaging perishable goods, such as beverages, foods, and cosmetics.

20 Claims, No Drawings

COPOLYESTERS OF 1,3-PROPANEDIOL HAVING IMPROVED GAS BARRIER PROPERTIES

FIELD OF THE INVENTION

The invention relates to copolyesters prepared from 1,3-propanediol, a dibasic acid component, and a comonomer. The copolyesters have improved crystallization rates, improved barrier properties, and are readily molded and extruded to form containers and films useful for packaging perishable goods.

BACKGROUND OF THE INVENTION

Poly(ethylene terephthalate) (PET) polyesters are known to be useful for the manufacture of transparent bottles, jars, food trays, and other containers used for packaging beverages and food products. Although PET containers have good clarity, the gas barrier properties of PET polymers with regard to gases, such as, oxygen and carbon dioxide are generally insufficient. For example, oxygen permeability into PET bottles which contain beer, wine, and food products cause these products to spoil. Accordingly, PET containers are generally not used to manufacture containers or films for food products requiring long shelf life.

However, polyester films and bottles useful for packaging food products are known in the art. For example, a polyester blend possessing reduced carbon dioxide permeability and improved oxygen barrier properties is described in U.S. Pat. No. 4,578,437. The polyester blends of this patent comprise a mixture of from about 40 to about 95% by weight of one or more copolyesters having an inherent viscosity of from about 0.4 to about 1.0 and from about 5 to about 60% by weight of poly(ethylene isophthalate) (PEI).

Further, U.S. Pat. No. 5,183,623 describes a process for producing transparent and heat-resistant polyester films and containers by thermoforming techniques. The process forms a sheet from a molten polyester resin having ester units derived from 1,3-propanediol and terephthalic acid ester-forming derivatives thereof. The sheet is then quenched so as to form a solid resin sheet having low crystallinity. After aging, the sheet is shaped by thermoforming under specific conditions that result in a highly crystalline container.

Japanese Patent Application 08-104763 describes a polyester film made of poly(propylene terephthalate) (PPT). According to this Japanese application, improved film properties are obtained by limiting the number of carboxyl terminal groups in the PPT film to 40 Eq/t or smaller. Further, Japanese Patent Application 05-031789 (1993) describes a method for manufacturing a blown bottle made of polyester resin containing at least 80 mole % of repeat units comprising an ester unit prepared from terephthalic acid and 1,3-propanediol. This application teaches that to avoid problems associated with polyester blown bottles, i.e., heat shrinkage, a polyester having specific repeating units is used as the raw material which is drawn and blow molded under specific conditions.

U.S. Pat. No. 5,798,433 describes a process for producing PPT. The process comprises effecting the ester interchange or direct esterification and polycondensation reactions through the use of a unique catalyst system which comprises a tin compound employed in the polycondensation reaction.

In spite of the polyesters and processes discussed above, there remains a need for a polyester having improved oxygen and carbon dioxide barrier properties as well as improved crystallization rates. Such polyesters should be readily processable into containers having these improved barrier properties. In particular, these improved properties should be achieved without requiring the specific process steps or parameters described above. The present invention answers this need.

SUMMARY OF THE INVENTION

It has been discovered that when copolyesters prepared from 1,3-propanediol and a dibasic acid component are copolymerized with from about 5 to about 15 mole percent of a second dibasic acid or glycol comonomer, copolyesters having improved crystallization rates, color, and barrier properties can be obtained. In this regard, the invention relates to a copolyester having an inherent viscosity ranging from about 0.4 to about 1.4 and a cold crystallization temperature ranging from about 120 to about 160° C. Such copolyesters comprise the reaction product of (A) a glycol component comprising from about 85 to about 100 mole % of 1,3-propanediol, (B) from about 85 to about 100 mole % of a dibasic acid component, and (C) from about 5 to about 15 mole % of a comonomer, wherein the total glycol component is based on 100 mol % and the total dibasic acid component is based on 100 mol %.

The dibasic acid component (B) is selected from the group consisting of terephthalic acid, napthalenedicarboxylic acid, and mixtures thereof. The comonomer (C) is selected from at least one of a dibasic acid component and a glycol component. The dibasic acid comonomer, which if present is different from the dibasic acid component (B) described above, is selected from the group consisting of terephthalic acid, napthalenedicarboxylic acid, 1,4-cyclohexane dicarboxylic acid, isophthalic acid, and mixtures thereof. The glycol comonomer is selected from the group consisting of ethylene glycol, diethylene glycol, neopentyl glycol, 1,4-cyclohexanedimethanol and mixtures thereof.

The invention also relates to a process for preparing the above-described copolyester. Such a process comprises reacting the 1,3-propanediol, the dibasic acid component and the comonomer as described above under polycondensation conditions. Amorphous preforms molded from a copolyester according to the invention are readily stretch blow molded into bottles or other container shapes. They may also be injection molded into various shapes or objects or extruded into film or sheeting. Accordingly, the invention also relates to films and containers, such as, bottles made from the above-described copolyester.

Additional objects and advantages of the invention are discussed in the detailed description which follows, and will be obvious from that description, or may be learned by practice of the invention. It is to be understood that both this summary and the following detailed description are exemplary and explanatory only and are not intended to restrict the invention in any way.

DETAILED DESCRIPTION OF THE INVENTION

The invention relates to a copolyester having an inherent viscosity ranging from about 0.4 to about 1.4 and a cold crystallization temperature ranging from about 120 to about 160° C. Such copolyesters comprise from about 5 to 15% of a comonomer which provides the copolyesters with advantageous oxygen and carbon dioxide barrier properties and lowers the crystallization temperature such that amorphous preforms can be molded from them.

The copolyesters of the invention are the reaction product of (A) a glycol component comprising from about 85 to about 100 mole % of 1,3-propanediol, (B) from about 85 to about 100 mole % of a dibasic acid component, and (C) from about 5 to about 15 mole % of a comonomer, as described below. Preferably, the copolyester is prepared by reacting from about 90 to about 100 mole % of 1,3-propanediol, from about 90 to about 100 mole % of the dibasic acid component, and about 10 mole % of the comonomer.

The dibasic acid component is selected from terephthalic acid, napthalenedicarboxylic acid, and mixtures thereof. Also suitable are the anhydrides, acid chlorides and lower, e.g., $C_1$–$C_8$ alkyl esters thereof. Any isomers of the dibasic acid or mixtures thereof may be used as the dibasic acid component, including, for example, 1,4-naphthalenedicarboxylic acid, 1,5-naphthalenedicarboxylic acid, 2,6-naphthalenedicarboxylic acid, 2,7-naphthalenedicarboxylic acid or mixtures thereof preferably methylar ethyl esters. The preferred isomer is 2,6-naphthalenedicarboxylic acid. In a preferred embodiment, the dibasic acid compound is a lower alkyl ester of terephthalic acid, more preferably, a dimethyl terephthalate.

The comonomer is selected from at least one of a dibasic acid comonomer and a glycol comonomer. The dibasic acid comonomer is selected from the group consisting of terephthalic acid, napthalenedicarboxylic acid, 1,4-cyclohexanedicarboxylic acid, isophthalic acid, and mixtures thereof. Also suitable are the anhydrides, acid chlorides and lower, e.g., $C_1$–$C_8$ alkyl esters thereof. Any isomers may be used, such as, for example, cis, trans, or cis/trans mixtures of 1,4-cyclohexanedicarboxylic acid. When the comonomer is a dibasic acid comonomer it should be different from the dibasic acid component described above. The glycol comonomer is selected from the group consisting of ethylene glycol, diethylene glycol, neopentyl glycol, 1,4-cyclohexanedimethanol and mixtures thereof Cis, trans, or cis/trans isomers may also be used. Preferably, the comonomer is selected from ethylene glycol, 2,6-naphthalenedicarboxylic acid, dimethyl 2,6-naphthalenedicarboxylate, 1,4-cyclohexanedimethanol, and isophthalic acid.

The copolyesters according to the invention are prepared by conventional polymerization processes known in the art, such as disclosed by U.S. Pat. Nos. 4,578,437, 5,340,909, 5,681,918, and 5,798,433, the disclosures of which are herein incorporated by reference. Examples of possible polymerization processes useful in the present invention include esterification or transesterification with a catalyst, such as described below, and with or without the introduction of an inert gas stream, such as nitrogen, solution condensation in a solvent, or melt condensation, at temperatures of up to about 250° C. or higher such that the water or alkanol produced is continuously removed.

As discussed above, the copolyesters of the invention have an inherent viscosity (I.V.) ranging from about 0.4 to about 1.4, preferably from about 0.6 to about 0.9 dl/g, measured at a temperature of 25° C. in a solvent mixture of symmetric tetrachloroethane and phenol having a weight ratio of tetrachloroethane and phenol of 2:3. It is also possible to increase the inherent viscosity of copolyesters of the invention using a conventional solid-state polymerization process. For example, a copolyester according to the invention may be comminuted (pelletized, powdered, or pulverized) and solid stated using conventional techniques such as, for example, by using a solid phase polycondensation fluid bed reactor at a temperature in the range of from about 180° C. to about 220° C. under reduced pressure or in an inert gas current, such as nitrogen.

In some cases it may be preferable to conduct the polymerization reaction in the presence of one or more conventional catalysts. Examples of suitable esterification or transesterification catalysts include, but are not limited to, compounds containing calcium, zinc, titanium, manganese, cobalt, etc. Preferred esterification or transesterification catalysts include manganese diacetate tetrahydrate, titanium tetraisopropoxide, and cobalt diacetate tetrahydrate. Suitable polymerization catalysts include, but are not limited to, soluble compounds of germanium, antimony, titanium, and tin. Preferred polymerization catalyst include germanium dioxide, antimony trioxide and antimony pentoxide.

The presence of 5 to 15 mole % comonomer in the copolyesters of the invention results in copolyesters having improved thermal properties, for example, lower crystallization temperatures and higher crystallization on heating temperatures. Indeed, the copolyesters of the invention have a cold crystallization temperature (Tcc) ranging from about 120 to about 160° C., preferably from about 125° C. to about 140° C., a glass transition temperature (Tg) ranging from about 40° C. to about 65° C., and a crystallization on heating temperature (Tch) ranging from about 80° C. to about 160° C. The Tcc, Tg, and Tch thermal properties are each determined by Differential Scanning Calorimetry (DSC) at a scanning rate of 20° C./min in a nitrogen atmosphere.

The advantageous thermal properties discussed below permit amorphous preforms of a copolyester of the invention to be readily stretch blow molded into bottles or other container shapes. They may also be injection molded into various shapes or objects or extruded into films or sheets. For example, because the crystallization temperature of the copolyesters of the invention is lowered, the crystallization rate of a melt of the copolyester is decreased. Thus, injection molding of preforms can be quenched with little or no crystallinity.

Accordingly, in another embodiment the invention relates to films and containers prepared from a copolyester according to the invention. Such films and containers can be prepared, for example, by mixing the copolyester in conventional melt blending equipment such as compounding extruders or Banbury mixers. As known in the art film or sheet material may be formed, e.g., directed from the melt blend or from preformed pellets.

Generally, a copolyester of the invention is shaped into an unoriented, low crystallinity, transparent sheet by drying the resin, extruding the resulting resin into a sheet using, for example, inflation or pressing techniques or an extruder fitted with an appropriately configured sheet-forming die, for example, a T-die extruder. Preferably, the sheet has a thickness ranging from about 5 mil to about 40 mil. The sheet is then contacted with a casting drum, such as chill roll, set at a sufficiently low temperature to thereby quench and solidify the sheet. The resulting sheet may then be thermally formed into a container having a desired shape by conventional thermoforming processes known in the art, including but not limited to, vacuum forming and pressure forming processes.

In another embodiment, the quenched sheet may be oriented minimally either monoaxially or biaxially by techniques known in the art. For biaxial extension, for example, the longitudinal and lateral extensions may be conducted at a temperature ranging from about 60° C. to about 150° C. in a draw ratio of about 2.5 to about 6.0 using, for example, a T. M. Long stretching apparatus. Preferably, the draw ratio in both longitudinal and lateral directions ranges from about 2.5 to about 4.0. A biaxially extended film according to the invention generally has a thickness ranging from about 0.2 mil to about 2.5 mil, more preferably from about 0.5 mil to about 1.0 mil.

Although not required, conventional additives may be added to the copolyesters according to the invention in typical amounts as taught, for example, by U.S. Pat. Nos. 5,340,909, and 5,798,433, the disclosures of which are herein incorporated by reference. Such additives include pigments, colorants, stabilizers, antioxidants, extrusion aids, slip agents, carbon black, nucleating agents, flame retardants and mixtures thereof.

The films and containers according to the invention have lower permeability to oxygen and carbon dioxide gases than comparable PET films and containers. Thus, the bottles, containers and films of this invention provide increased shelf storage life for contents, including perishable goods such as beverages, foods, and cosmetics that are sensitive to the permeation of gases. Preferably, the oxygen permeability rate of films and containers according to the invention is less than about 10.0 cc-mils/100 in$^2$-24hrs-atm and the carbon dioxide permeability rate is less than about 45.0 cc-mils/100 in$^2$-24hrs-atm. More preferably, the oxygen permeability rate is less than about 6 cc mils/100 in$^2$-24hrs-atm and the carbon dioxide permeability rate is less than about 27 cc -mils/100 in$^2$-24hrs-atm. The oxygen and carbon dioxide permeability rates can be determined on film and containers using, for example, ASTM standard D3985.

In a preferred embodiment, the film and containers according to the invention are transparent, preferably having an L* color value of at least about 70, an a* value ranging from about (–) 1.5 to 1.5, and a b* value ranging from about (–)3.5 to about 5. The color values may be determined using any suitable colorimeter known in the art, such as, for example, a Hunter Lab Ultrascan Spectrophotometer.

EXAMPLES

The following examples are intended to illustrate, but not limit, the scope of the present invention. The Tg, Tcc and Tch thermal properties discussed of the following Examples were determined by Differential Scanning Calorimetry (DSC) at a scanning rate of 20° C./min in a nitrogen atmosphere. The color valves were obtained using a Hunter Lab Ultrascan Spectrophotometer.

Example 1—Comparative

In this example a poly(trimethylene terephthalate) homopolyester was prepared. 135.8 grams (0.70 moles) of dimethyl terephthalate, 79.8 grams (1.05 moles) of 1,3 propanediol, 0.25 ml of a butanol solution containing 30 grams titanium tetraisopropoxide in 500 ml of n-butanol, 0.0354 grams manganese diacetate tetrahydrate, 0.0488 grams cobalt diacetate tetrahydrate, and 0.0397 grams antimony trioxide were added to a 500 ml 3-necked round bottom flask equipped with a ground glass head, a stirrer, and a nitrogen inlet. The flask was immersed in a Belmont metal bath and was heated for 2 hours at 200° C. and 1 hour at 210° C. After this time the theoretical amount of methanol was collected. 1.95 ml of a solution containing 173 grams ZONYL A (a mixed phosphate ester containing 8 wt. % phosphorous available from Dupont Chemical Company) in 185 ml butanol and 1192 ml of 1,3 propanediol was added and the temperature is increased to 280° C. The pressure in the flask was reduced from atmospheric to between about 0.1 to about 0.5 mm for 90 minutes. Stirring was reduced as the viscosity increased until a stir rate of 25 RPM was obtained. The vacuum was discontinued and nitrogen was bled into the flask. The polymer was allowed to solidify by cooling to a temperature below Tg, removed from the flask and ground to pass a 3 mm screen. The inherent viscosity of the polymer was 0.69. The polymer had a Tm of 234° C., a Tg of 49° C. and a Tcc of 156° C. by DSC analysis.

Samples of this homopolymer were injection molded into bottle preforms using a melt temperature of 274° C. When the preforms were removed from the mold, they developed a high degree of crystallinity. Thus, it was not possible to stretch blow mold these crystalline preforms into bottles.

Example 2

In this example a poly(trimethylene terephthalate) copolyester containing 6 mole % ethylene glycol was prepared. 135.8 grams (0.70 moles) of dimethyl terephthalate, 79.8 grams (1.05 moles) of 1,3 propanediol, 11.5 grams (0.185 moles) of ethylene glycol, 0.25 ml of butanol solution containing 30 grams titanium tetraisopropoxide in 500 ml of n-butanol, 0.0354 grams manganese diacetate tetrahydrate, 0.0488 grams cobalt diacetate tetrahydrate, and 0.0397 grams antimony trioxide were added to a 500 ml 3-necked round bottom flask equipped with a ground glass head, a stirrer, and a nitrogen inlet. The flask was immersed in a Belmont metal bath and heated for 2 hours at 200° C. and 1 hour at 210° C. After this time the theoretical amount of methanol was collected. 1.95 ml of a solution containing 173 grams ZONYL A in 185 ml butanol and 1192 ml of 1,3 propanediol were added and the temperature was increased to 280° C. The pressure in the flask was reduced from atmospheric to between about 0.1 to 0.5 mm of Hg for 90 minutes. Stirring was reduced as the viscosity increased until a stir rate of 25 RPM was obtained. The vacuum was discontinued and nitrogen was bled into the flask. The polymer was allowed to solidify by cooling to a temperature below Tg, removed from the flask and ground to pass a 3 mm screen. The inherent viscosity of the polymer was 0.69. The polymer had a Tm of 228° C., a Tg value of 50° C. and a Tcc of 125° C. Compositional analysis (by NMR) showed that the copolyester contained 6.1 mole % ethylene glycol.

Samples of this copolyester were injection molded into bottle preforms at a melt temperature of 270° C. The clear preforms were amorphous and had good color (L*=84.63, a*=(–)1.03, b*=(–)3.01). These preforms were readily stretch blow molded into clear bottles at 75° C. and 175 psig pressure.

Samples of this copolyester were extruded into a 10 mil film at 270° C. The films were biaxially stretched to a draw ratio of approximately 4.0 to 4.0 at 75° C. to give a film thickness of 0.7 mils. The films had good clarity and appearance. The oxygen permeability rate was 4.6 cc mils/100 in.$^2$ -24 hrs-atm as determined by ASTM method D3985. For comparison, a homopolymer PET having an IV of 0.75, extruded into a 10 mil film and biaxially oriented to a draw ratio of 4.0 to 4.0, and having a thickness of 0.7 mil had an oxygen permeability rate of 7.3 cc mils/100 in$^2$ -24 hrs-atm.

Example 3

In this example, a poly(trimethylene terephthalate) copolyester containing 9 mole % 2,6-naphthalenedicarboxylic acid was prepared. 79.8 grams (1.05 moles) of 1,3-propanediol, 124.2 grams (0.64 moles) of dimethyl terephthalate, 14.6 grams (0.06 moles) of dimethyl 2,6-naphthalenedicarboxylate, 0.25 ml of butanol solution containing 30 grams titanium tetraisopropoxide in 500 ml of n-butanol, 0.0354 grams manganese diacetate tetrahydrate, 0.0488 grams cobalt diacetate tetrahydrate, and 0.0397 grams antimony trioxide were added to a 500 ml 3-necked round bottom flask equipped with a ground glass head, a stirrer, and a nitrogen inlet. The flask was immersed in a Belmont metal bath and heated for 2 hours at 200° C. and 1 hour at 210° C. After this time the theoretical amount of methanol was collected. 1.95 ml of a solution containing 173 grams ZONYL A in 185 ml butanol and 1192 ml of 1,3-propanediol were added and the temperature was increased to 280° C. The pressure in the flask was reduced from atmospheric to between about 0.1 to 0.5 mm of Hg for 90 minutes. Stirring was reduced as the viscosity increased until a stir rate of 25 RPM was obtained. The vacuum was discontinued and nitrogen was bled into the flask. The polymer was allowed to solidify by cooling to below Tg, removed from the flask and ground to pass a 3 mm screen. The inherent viscosity of the polymer in the melt phase was 0.62. The polymer had a Tm of 211° C. and a Tg value of 56° C. No Tcc was present under the scan conditions of 20° C./min. Compositional analysis (by NMR) showed that the copolyester contained 9 mole % 2,6 naphthalenedicarboxylic acid.

The copolyester was then granulated, dried and solid stated to an I.V. of 0.91 in a solid phase polycondensation fluid bed reactor at 190° C. using nitrogen gas to remove liberated glycol. Then the copolyester was injection molded into amorphous preforms and subsequently stretch blow molded in bottles. Similarly good bottles were obtained when a copolyester containing 14 mole % 2,6-naphthalenedicarboxylic acid with final I.V. of 0.83 was prepared.

Example 4

Using the procedure of Example 2, a poly(trimethylene terephthalate) copolyester containing 7 mole % isophthalic acid was prepared having an I.V. of 0.67. The polymer had a Tm of 224° C., a Tg value of 47° C. and a Tcc of 125° C. It was injection molded into clear, amorphous preforms which were subsequently stretch blow molded into bottles. Similarly good bottles were obtained with a poly (trimethylene 2,6-naphthalenedicarboxylate) copolyester containing 11 mole % terephthalic acid and having an I. V. of 0.71.

Example 5

A poly(trimethylene terephthalate) copolyester containing 5 mole % 1,4-cyclohexanedimethanol was prepared using the procedure of Example 2 and solid stated to provide a polymer having an I. V. of 0.90. The polymer had a Tm of 223° C., a Tg value of 51° C. and a Tcc of 130° C. The copolyester was extrusion blow molded into 2-liter bottles using a melt temperature of 240° C. and air pressure of 120 psig. Visual inspection showed the containers to be clear and with a good appearance.

Example 6

The following example demonstrates the improved barrier properties (determined by ASTM method D3985) of biaxially oriented films prepared from poly(trimethylene terephthalate) (PTT) copolyesters according to the invention when compared to the barrier properties of biaxially oriented films prepared from poly(ethylene terephthalate) (PET) and PTT homopolyesters. Copolyesters where biaxially oriented at a temperature of equal to Tg +20° C. in a draw ratio that ranged from 3.5 to 4.0. The results are tabulated below in Table 1.

TABLE 1

| Polyester | Biaxial Orientation | $O_2$ Permeability* | % Improvement in $O_2$ barrier over PET |
|---|---|---|---|
| PTT copolyester containing 10 mole % ethylene glycol | 4 | 3.4 | 24% |
| PTT copolyester containing 20 mole % ethylene glycol | 4 | 7.0 | −40% |
| PTT copolyester containing 15 mole % isophthalic acid | 4 | 3.6 | 17% |
| PTT copolyester containing 20 mole % isophthalic acid | 4 | 7.8 | −42% |
| PTT copolyester containing 15 mole % 2,6 naphthalenedicarboxylic acid | 4 | 2.6 | 62% |
| PTT copolyester containing 30 mole % 2,6 naphthalenedicarboxylic acid | 4 | 7.8 | −46% |
| PTT | 3.5 | 3.1 | 35% |
| PET | 4 | 4.2 | — |

*units are cc-mil/100 in²/24 hrs-atm
These results show that when the copolyester is based on greater than 15 mol % of the comonomers, the improved oxygen barrier is not obtained.

Example 7

The thermal properties of poly(trimethylene terephthalate) (PTT) containing various comonomers were compared to a PTT homopolyesters. The results are tabulated below in Table 2.

TABLE 2

| Polyester | Tg (°C.) | Tch (°C.) | Tch Cal/g | Tm (°C.) | Tm Cal/g | Tcc (°C.) | Tcc Cal/g |
|---|---|---|---|---|---|---|---|
| PTT copolyester containing 20 mole % ethylene glycol | 54.5 | 112.5 | 8.4 | 203.4 | 9.5 | none* | none* |
| TT copolyester containing 20 mole % isophthalic acid | 45.8 | 99.9 | 8.3 | 197.8 | 9.1 | none* | none* |
| PTT copolyester containing 30 mole % 2,6-naphthalenedicarboxylic acid | 62.2 | 153.5 | 0.2 | 185.1 | 0.4 | none* | none* |
| PTT | 48.3 | 77.7 | 9.2 | 229.8 | 14.8 | 150.6 | 11.7 |

*crystallized too slow for a measurement in a reasonable amount of time
These results show that when the copolyester is based on greater than 15% of comonomers the improved thermal properties of the copolyesters according to the invention are not obtained.

What is claimed is:

1. A copolyester having an inherent viscosity ranging from about 0.4 to about 1.4 dl/g and a cold crystallization temperature ranging from about 120 to about 160° C., said copolyester comprising the reaction product of:
   (A) a glycol component comprising from about 85 to about 100 mole % 1,3-propanediol;
   (B) a dibasic acid component comprising from about 85 to about 100 mole % of a dibasic acid selected from the group consisting of terephthalic acid, napthalenedicarboxylic acid, anhydrides, acid chlorides, and lower alkyl esters thereof, and mixtures thereof; and (C) from about 5 to about 15 mole % of a comonomer selected from the group consisting of (i) a dibasic acid component selected from the group consisting of terephthalic acid, napthalenedicarboxylic acid, 1,4-cyclohexanedicarboxylic acid, isophthalic acid, anhydrides, acid chlorides, and lower alkyl esters thereof, and mixtures thereof, wherein the dibasic acid comonomer (i), when present, is different from the dibasic acid (B); (ii) a glycol component selected from the group consisting of ethylene glycol, diethylene glycol, neopentyl glycol, 1,4-cyclohexanedimethanol and mixtures thereof; and (iii) a mixture of (i) and (ii);

wherein the total glycol component is based on 100 mole % and the total dibasic acid component is based on 100 mol %.

2. A copolyester according to claim 1, comprising the reaction product of:

(1) from about 85 to about 100 mole %1,3-propanediol;

(2) from about 85 to about 100 mole % of said dibasic acid component (B); and (3) from about 10 to about 15 mole % of said comonomer (C).

3. A copolyester according to claim 2, wherein said dibasic acid component (B) is dimethyl terephthalate and said comonomer (C) is selected from the group consisting of ethylene glycol, isophthalic acid, napthalenedicarboxylic acid, and mixtures thereof.

4. A copolyester according to claim 1, comprising the reaction product of:

(1) from about 90 to about 100 mole % of 1,3-propanediol;

(2) from about 90 to about 100 mole % of said dibasic acid component (B); and (3) about 10 mole % of said comonomer (C).

5. A copolyester according to claim 1, wherein the inherent viscosity ranges from about 0.6 to about 0.9 dl/g and the cold crystallization temperature ranges from about 125 to about 140° C.

6. A copolyester composition comprising the polyester according to claim 1 and an additive selected from the group consisting of a pigment, a colorant, a stabilizer, an antioxidant, an extrusion aid, a slip agent, carbon black, a nucleating agent, a flame retardant and mixtures thereof.

7. A film prepared from the copolyester according to claim 1.

8. The film according to claim 7, having an oxygen permeability rate of less than 10.0 cc-mils/100 in$^2$-24hrs-atm and a carbon dioxide permeability rate of less than about 45.0 cc -mils/100 in$^2$-24hrs-atm.

9. The film according to claim 8, wherein the oxygen permeability rate is less than about 6 cc mils/100 in$^2$-24hrs-atm and the carbon dioxide permeability rate is less than about 27.0 cc mils/100 in$^2$-24hrs-atm.

10. The film according to claim 8, wherein the film is transparent.

11. The film according to claim 10, wherein the film has a L* color value of at least about 70.

12. A molded container prepared from the copolyester according to claim 1.

13. The container according to claim 12, having an oxygen permeability rate of less than 7.3 about 10.0 cc mils/100 in$^2$-24hrs-atm and a carbon dioxide permeability rate of less than about 45.0 cc mils/100 in$^2$-24hrs-atm.

14. The container according to claim 13, wherein the oxygen permeability rate is less than about 6 cc mils/100 in$^2$-24hrs-atm and the carbon dioxide permeability rate is less than about 27.0 cc mils/100 in$^2$-24hrs-atm.

15. The container according to claim 12, wherein the container is transparent.

16. The container according to claim 12, containing a perishable good.

17. The container according to claim 16, wherein the perishable good is a beverage, a food, or a cosmetic.

18. A process for preparing a copolyester having an inherent viscosity ranging from about 0.4 to about 1.4 and a cold crystallization temperature ranging from about 120 to about 160° C., said process comprising the step of reacting, under polycondensation conditions, (A) a glycol component comprising from about 85 to about 100 mole % 1,3-propanediol;

(B) a dibasic acid component comprising from about 85 to about 100 mole % of a dibasic acid selected from the group consisting of terephthalic acid, napthalenedicarboxylic acid, anhydrides, acid chlorides, and lower alkyl esters thereof, and mixtures thereof; and (C) from about 5 to about 15 mole % of a comonomer selected from the group consisting of (i) a dibasic acid component selected from the group consisting of terephthalic acid, napthalenedicarboxylic acid, 1,4-cyclohexanedicarboxylic acid, isophthalic acid, anhydrides, acid chlorides, and lower alkyl esters thereof, and mixtures thereof, wherein the dibasic acid comonomer (i), when present, is different from the dibasic acid (B); (ii) a glycol component selected from the group consisting of ethylene glycol, diethylene glycol, neopentyl glycol, 1,4-cyclohexanedimethanol and mixtures thereof; and (iii) a mixture of (i) and (ii);

wherein the total glycol component is based on 100 mol % and the total dibasic acid component is based on 100 mol %.

19. The process according to claim 18, wherein said inherent viscosity ranges from about 0.6 to about 0.9 dl/g and said cold crystallization temperature ranges from about 125 to about 140° C.

20. The process according to claim 18, wherein said dibasic acid component (B) is dimethyl terephthalate and said comonomer (C) is selected from the group consisting of ethylene glycol, isophthalic acid, napthalenedicarboxylic acid, and mixtures thereof.

* * * * *